United States Patent [19]

Harriman et al.

[11] 4,176,026
[45] Nov. 27, 1979

[54] PROCESS FOR CATALYTIC PHOTO-OXIDATION OF WATER

[75] Inventors: Anthony Harriman; George Porter, both of London, England

[73] Assignee: National Research Development Corporation, London, England

[21] Appl. No.: 895,555

[22] Filed: Apr. 12, 1978

[30] Foreign Application Priority Data

Apr. 13, 1977 [GB] United Kingdom ............ 15369/77

[51] Int. Cl.² .................................. B01J 1/10
[52] U.S. Cl. ............................... 204/157.1 R
[58] Field of Search ..................... 204/157.1 R

[56] References Cited

U.S. PATENT DOCUMENTS

| | | | |
|---|---|---|---|
| 4,008,136 | 2/1977 | Williams | 204/157.1 R |
| 4,045,315 | 8/1977 | Ryason | 204/157.1 R |

Primary Examiner—Howard S. Williams
Attorney, Agent, or Firm—Sughrue, Rothwell, Mion, Zinn and Macpeak

[57] ABSTRACT

A photochemical process in which visible light is used to irradiate a solution comprising water, a manganese (II) or manganese (III) complex of formula MnL wherein L is a phthalocyanine ligand, a 5, 10, 15, 20—tetraphenylporphyrin ligand or a 5, 10, 15, 20—tetrapyridylporphyrin ligand, and a suitable electron acceptor. The process results in the oxidation of water into oxygen and the reduction of the electron acceptor. The reduced electron acceptor may be used as, or converted to, a chemical fuel.

19 Claims, 3 Drawing Figures

4,176,026

PROCESS FOR CATALYTIC PHOTO-OXIDATION OF WATER

BACKGROUND OF THE INVENTION

1. Field of the Invention

The present invention relates to the photochemical oxidation of water.

2. Discussion of Prior Art

As stocks of conventional fuels such as coal, oil and natural gas become more and more depleted, greater effort is being made to find practical ways of using sunlight which is incident on earth as a direct source of energy. Known methods of using sunlight as an energy source are, for example, the use of photo-electric cells in "solar batteries" to produce electrical energy from sunlight and the use of solar panels for heating purposes.

A disadvantage of these methods is that they are not capable of giving long term storage of energy.

The most useful method of solar energy utilisation would be a cyclic chemical process such as that used by plants in photosynthesis because such a method would be able to make the fullest possible use of sunlight which reaches the earth's surface only at intermittent intervals.

At present, other than the processes which occur in plants themselves, there are no reported methods in which visible light is used to oxidise water into oxygen and in which the electrons which are released by the water in such a process are captured by an electron acceptor to form a compound which acts as a store of energy and which may subsequently be used as a chemical fuel.

The photooxidation of water to oxygen is a very difficult process, and as far as we are aware there are only two systems which are known to work. These systems involve ultra-violet ($\lambda 254$ nm) photolysis of iron (III) and cerium (IV) salts in acidic solution (see V. Balzani and V. Carassiti, Photochemistry of Coordination Compounds, Academic Press, London (1970)).

It is not feasible to use a dye to sensitise these reactions to visible light because of the involvement of hydroxyl radicals, which react with the dye to form hydroxylated products. In order to avoid formation of radicals it is necessary to devise some kind of charge storage whereby the oxidant in the reaction system can be raised to a state in which it possesses more than one oxidation equivalent. The formation of one molecule of oxygen from water requires overall the transfer of four electrons.

Plants are known to use a manganese complex to perform a photooxidation of water to produce oxygen. M. Calvin in Science 1974, 184, P375 has suggested using a binuclear manganese (IV) compound such as di-$\mu$-oxotetrakis (2, 2'-bipyridyl) manganese (IV, III) to simulate the photooxidation process. Irradiation of this compound or the related 1,10-phenanthroline complex with light of a wavelength of about 300 nm in acidic solution does not produce oxygen (see S. R. Cooper and M. Calvin, Science, 1974, 185, 376, and Y. Otsuji et al., Chem. Letts, 1977, 983). Furthermore, we have found that the corresponding manganese (II) complexes cannot be photooxidised to higher valence complexes (see R. G. Brown, A. Harriman, and G. Porter, J.C.S. Faraday Trans. II, 1977, 73, 113) so that with these complexes of manganese a cyclic system cannot be conceived.

Manganese porphyrin and phthalocyanine compounds are reviewed in a paper by L. J. Boucher, Coord. Chem. Revs, 1972, 7, 289, and show intense absorption in the visible region. Thus, these compounds can be excited directly with light corresponding to the solar spectrum and some photoreduction of manganese (III) phthalocyanine ($Mn^{III}Pc$) in organic solvents has been reported by G. Engelsma, et al., J. Phys. Chem, 1962, 66, 2517. However, no photooxidation of the manganese (III) complexes to manganese (IV) complexes takes place under such conditions and no oxygen is generated.

T. S. Glikman and L. N. Zavgorodnyaya, Biokhimiya, 1973, 38, 101, describe the use of quinones to assist oxidation of a manganese (II) pheophorbide or pheophytin complex to the corresponding manganese (III) pheophorbide or pheophytin complex in highly basic solution. However, in the systems described in this paper, the pheophorbide or pheophytin ligands are unstable to further oxidation and it would appear that these ligands would themselves be oxidised in the presence of an oxidant, rather than the central manganese (III) atom. As a result, in these reaction systems no manganese (IV) complexes are produced. Furthermore, in the presence of the hydroxide ions of the highly basic solution the manganese (III) complexes react rapidly with the hydroxide ions and are reduced back to complexes of manganese (II) which is the stable oxidation state of manganese under these conditions.

To our knowledge, neither the photochemical production of a Mn (IV) compound (of any description) nor the successful photogeneration of $O_2$ using a Mn complex has been reported in the literature.

SUMMARY OF THE INVENTION

An object of the present invention is to provide a process by means of which visible light can be used to photo-oxidise water into oxygen and in which the electrons which are released from the water in such a process are captured by an electron acceptor to form a compound which acts as a store of energy, which compound may subsequently be used as, or converted to, a chemical fuel.

According to the present invention there is provided a process for the catalytic photooxidation of water by visible light which process comprises irradiating with light in the visible region of the spectrum a solution comprising:

(i) water, (ii) as photo catalyst, a starting manganese complex which is a manganese (II) or manganese (III) complex of formula MnL wherein L is a phthalocyanine ligand, a 5, 10, 15, 20-tetraphenylporphyrin (TPP) ligand or a 5, 10, 15, 20-tetrapyridyl porphyrin (TPyP) ligand, each of said ligands optionally being substituted by further substituents, the said starting manganese complex being capable of undergoing a transition into an excited state on irradiation with visible light with subsequent conversion to the corresponding manganese (IV) complex, and (iii) a compound which is an electron acceptor and which is a sufficiently powerful oxidising agent to abstract electrons from the excited manganese complex, the pH of the reaction mixture being chosen so that upon irradiation, the starting manganese complex will be oxidised to the corresponding manganese (IV) complex and the electron acceptor will be reduced to form a reduced electron acceptor and so that, subsequently, the manganese (IV) complex will be reduced back to the corresponding manganese (II) complex with concomitant conversion of water into oxygen.

Thus the process of the present invention is carried out under conditions such that Mn (II) and Mn (III) can be photooxidised to Mn (IV) which is a powerful oxidant and which can react, photochemically or thermally, to liberate $O_2$ from water and itself return to the starting manganese complex.

In the present process the overall reaction is the oxidation of water to oxygen and the simultaneous reduction of an electron acceptor to form a compound which acts as a store of energy and which may subsequently be used as, or converted to, a chemical fuel.

Both the manganese complex and the electron acceptor must either be water soluble compounds or must be capable of being solubilised into a micellar solution by the presence in the compound of suitable ligands such as long aliphatic chains which are hydrophobic or by the use of micelle-forming surfactants such as sodium lauryl sulphate or cetyltrimethyl ammonium bromide. In this way the required aqueous solutions of reactants can be formed. When the manganese complex is present in the form of micelles, then it is usual to use a water-soluble electron acceptor. Similarly if the electron acceptor is present in the form of micelles, the manganese complex used is usually one which is water-soluble.

The starting manganese complex used in the process of the present invention will absorb light in the visible region of the spectrum, that is to say will absorb energy from sunlight, and will undergo a photooxidation reaction to form the corresponding manganese (IV) complex, which at an appropriate pH will react, thermally or photochemically, with water to give oxygen.

The phthalocyanine and porphyrin ligands preferably contain at least two, and generally up to eight, water-solubilising groups. In this specification, a water-solubilising group means a group such as a carboxy group or sulpho group which increases the hydrophilic character of a compound to which it is attached. There are usually four water-solubilising groups present in each ligand, one on each of the four benzene rings of each ligand. Particularly preferred starting manganese complexes are a phthalocyanine complex of formula:

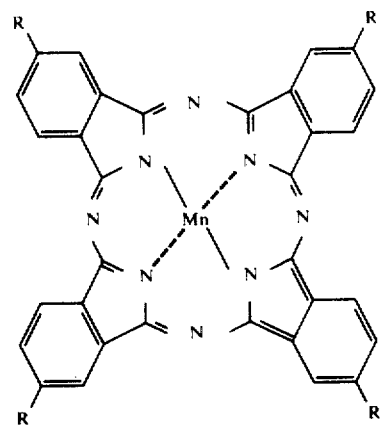

wherein R is a —$CO_2H$ or a —$SO_3H$ group; or a tetraphenylporphyrin complex of formula

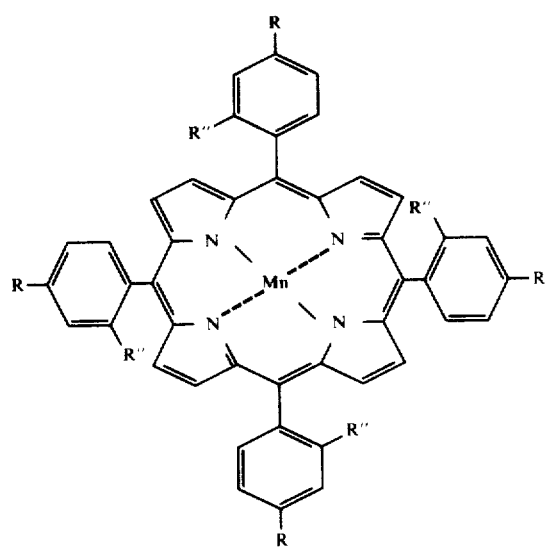

wherein R is also a —$CO_2H$ or —$SO_3H$ group, and R'' is a $C_1$ to $C_4$ alkyl group. It has also been found that when the —$CO_2H$ groups mentioned above are replaced by groups such as —$CO_2R'$, or when the —$SO_3H$ groups mentioned above are replaced by —$SO_2NHR'$, wherein R' is a $C_{16}$ to $C_{22}$ alkyl group, especially a $C_{18}$ alkyl group, the resultant complex, although not water soluble, will form micelles in aqueous solution and enable the process of the invention to take place. Such micelles are believed to have manganese atoms near their outer surfaces. Conversion of the —$CO_2H$ groups into the corresponding —$CO_2R'$ groups is performed by conventional methods such as reaction of the —$CO_2H$ groups with an alkyl halide; the $SO_2NHR'$ groups are prepared by reaction of the $SO_3H$ groups with an alkyl amine.

Examples of preferred tetrapyridylporphyrin complexes are the water soluble complex of formula:

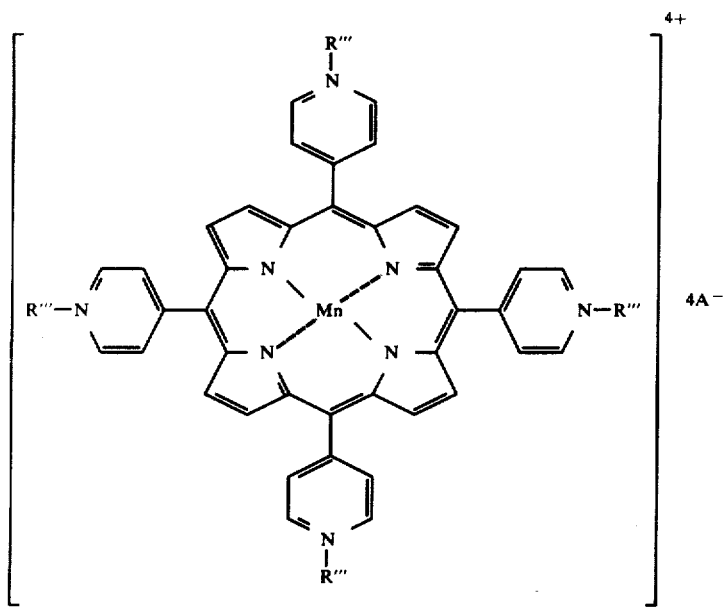

wherein each R''' group is a $C_{1-4}$ alkyl group, preferably a methyl group, and $A^-$ is a suitable anion such as iodide, and the corresponding free-bases which are also water soluble. The corresponding N,N',N'',N'''-tetra $C_{16}$ to $C_{22}$—alkyl derivatives are also suitable; these compounds are not water soluble, but form a dispersion of micelles in water.

Examples of suitable electron acceptors are quinones such as benzo-1,4-quinone and anthra-9,10-quinone, each optionally substituted with one or more atoms or groups chosen from alkyl, chloro, sulpho, phenylsulphonyl and cyano atoms or groups; a 1,4-naphthaquinone; certain heterocyclic compounds such as pyrazine and mono-, di-, tri- or tetramethylpyrazine, quinoxaline, phenazine, N-methylphenazine sulphate, NADH, methyl viologen and benzyl viologen, and dyes such as thionine and methylene blue.

Particularly preferred benzo-1,4-quinones are those of general formula (I)

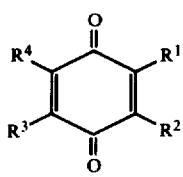

wherein each of $R^1$, $R^2$, $R^3$, and $R^4$ independently represents a hydrogen or a chlorine atom, or a methyl, sulpho, phenylsulphonyl or cyano group. In addition, when the quinone is to be incorporated in micelles, each of $R^1$, $R^2$, $R^3$ and $R^4$ may independently represent a higher alkyl group, particularly a $C_{16}$ to $C_{22}$-alkyl group.

Particularly preferred anthra-9,10-quinones are those of general formula (II)

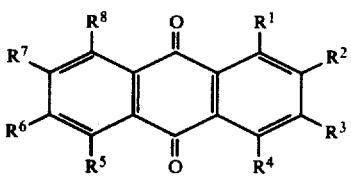

wherein each of $R^1$ to $R^8$ independently represents a hydrogen or chlorine atom or a methyl, sulpho, phenylsulphonyl, cyano or carboxy group.

More preferred are anthra-9,10-quinones of general formula (II), wherein each of $R^1$ and $R^2$ independently represents a hydrogen atom or a sulpho or carboxy group, and each of $R^5$ and $R^6$ independently represents a hydrogen atom, or a sulpho or carboxy group.

With an homogeneous aqueous solution, the electron acceptor is choosen to be soluble and stable in water at the pH used for the process. If the Mn complex is water-insoluble and is solubilised by use of a micelle-forming material then, again, the electron acceptor must be water-soluble and stable at the pH used. Electron acceptors that are insoluble in water, such as 2,3,5,6-tetrachloro-1,4-benzoquinone, are solubilised in a micelle-forming material and are used in conjunction with a water soluble Mn complex. In such cases, the manganese complex or the electron acceptor is formed into a micellar solution as described below in the Examples.

In most cases, the concentration of electron acceptor is controlled so that the molar ratio of electron acceptor to Mn complex is of the order of 100:1. This gives a large excess of electron acceptor and increases the yield of products.

In the process of the present invention, the photooxidation reactions are brought about by low energy visible light. This allows the reaction to be performed in sunlight. If desired, one or more sensitisers can be used to harvest the higher energy bands of the sunlight and channel them into the reaction system.

In this manner, the wave length dependence of the photochemical reaction resembles the absorption spectrum of the overall mixture of sensitisers, the mixture of sensitisers preferably being chosen so that their overall spectrum is closely matched to the optimum spectral output of the sun.

In the present process a highly oxidised manganese (IV) complex is formed and this complex can be used to oxidise water. At the appropriate pH, the manganese (IV) complex is unstable with respect to water. As a result, it is reduced by water and is converted back to the starting manganese complex. During this reduction step, water is oxidised to oxygen. The nature of the manganese (IV) complex is uncertain but it is probable that it exists as an oxobridged binuclear species, i.e. a dimer with two oxygen functions bridging two manganese atoms. The conversion of the manganese (IV) complex back to the starting manganese complex provides a cyclic system for the photooxidation of water. A probable mechanism for this sequence of reactions is therefore as follows:

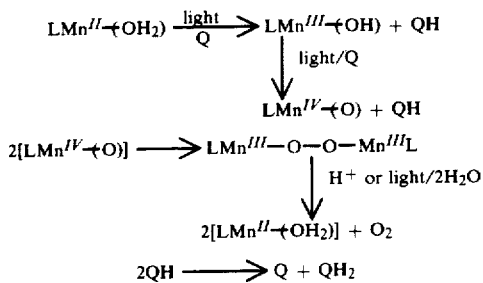

wherein Q represents the quinone or other electron acceptor, L represents the phthalocyanine or phorphyrin ligand of the manganese complex. $H_2O$, OH and O are axially liganded to the manganese complex. QH represents the semi-quinone and is generally formed in two steps with $Q^-$ as intermediate.

This mechanism is supported by Example A which shows that one molecule of oxygen is formed for the production of two molecules of the manganese (II) complex.

The water molecules that are oxidised to oxygen may form part of the solvent shell of the metal complex. More usually the water molecules may also be an integral part of the transition metal complex, for example, water attached to axial positions within the complex or water that forms a bridging ligand within a binuclear complex.

Thus the present invention is concerned with photooxidation, and subsequent reduction with water, of manganese complexes. Both oxidation and reduction steps are dependent upon pH, because the pH affects the redox potentials of the manganese complexes. In general, oxidation requires higher pH conditions whilst reduction proceeds more readily in acidic solution. The pH of the reaction solution is chosen so that an efficient cyclic reaction system and optimum yields of photoproducts are obtained. Several parameters have to be taken into account when deciding which pH range is most suitable for a particular system. These parameters include the stability of the reactants at the chosen pH, and the solubility of reactants, the competitive reduction of the higher valence Mn complexes by $OH^-$, the ease of oxidation of $Mn^{(II)}$ and $Mn^{(III)}$, the ease of reduction of $Mn^{(IV)}$, the ease of oxidation of hydroquinone by $O_2$, each considered at the chosen pH.

In general, the most suitable pH range is found to be 4 to 11, more preferably 7 to 9.

The resultant reduced electron acceptor acts as a store of energy. Release of this energy can be achieved by generating hydrogen from the reduced electron acceptor by several methods, most of which are known. For example:

(i) reaction of the reduced electron acceptor with an enzyme catalyst such as hydrogenase or a synthetic iron/sulphur protein or a metal such as platinum. This method is suitable when the electron acceptor is for example methyl viologen ($MeV^{2+}$) or benzyl viologen, thionine or methylene blue. The reaction can be represented as:

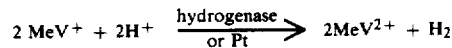

(ii) electrolytic oxidation of the reduced electron acceptor. This method is suitable when the electron acceptor is for example a quinone or one of the heterocyclic compounds mentioned above. The oxidation can be represented as:

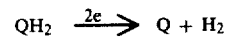

It should be noted that although energy is expanded in this process, the amount required is less than for direct electrolysis of water.

Thus according to the process of the present invention water can effectively be photo-oxidised using light in the visible region of the spectrum to yield oxygen and a reduced electron acceptor which is itself useful as a chemical fuel or can be converted into other fuels such as hydrogen.

An apparatus and method for collecting solar energy in which the photooxidation process of the present invention can be used to convert water into oxygen and a chemical fuel is described in British Patent Application No. 24404/77 which is equivalent to U.S. Application Ser. No. 914,241 filed June 9, 1978.

DETAILED DESCRIPTION OF THE INVENTION

Figure 1:
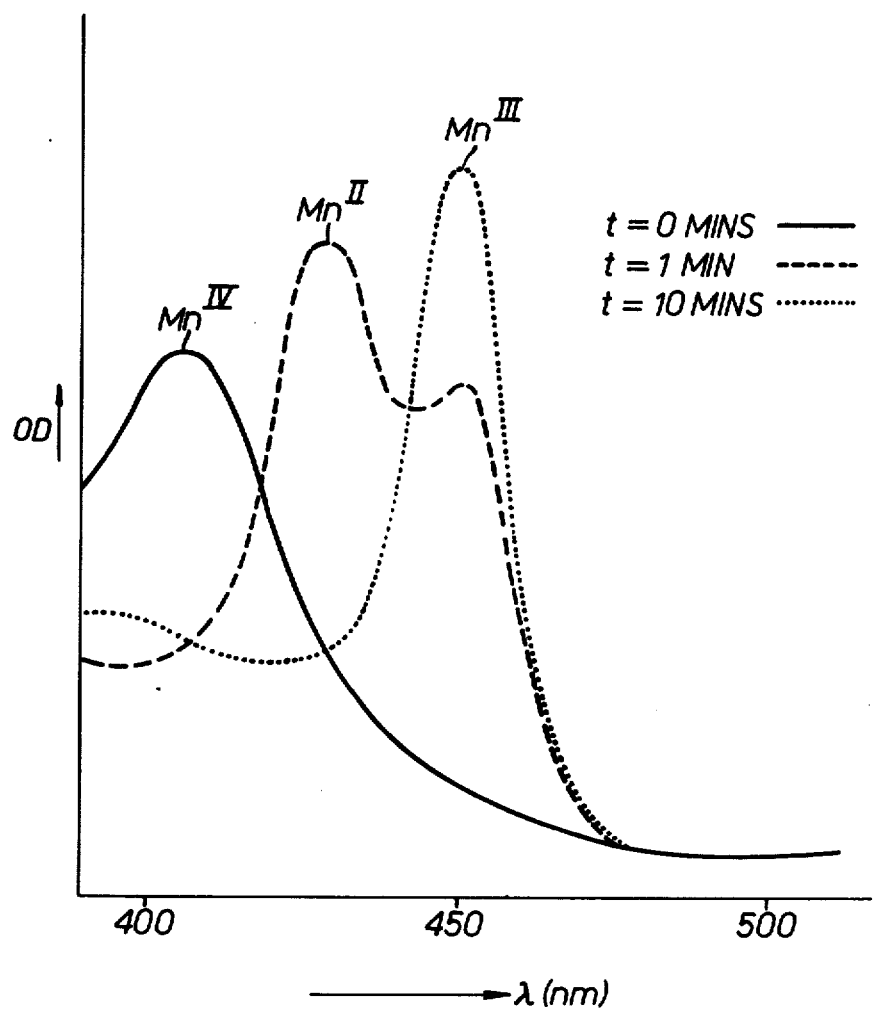
FIG. 1 shows the reaction profile obtained during the performance of later described Experiment A.

The following Examples further illustrate the present invention.

In the Examples, the Mn complex is dissolved in water or in an aqueous dispersion of micelle-forming material to give a concentration of complex of about $10^{-4}$M. The complex is dissolved in water by simply stirring the mixture for about 30 mins. The methods used for forming micellar solutions are described below. The pH of the aqueous solution is then adjusted to a predetermined value. The value is selected as described above, the preferred range being $7.0 \leq pH \leq 9.0$. The required pH is obtained either by addition of a buffer or by simple addition of NaOH. The pH is then checked with a conventional pH meter.

Preparation of micelles

These are prepared using conventional micelle forming compounds such as sodium lauryl sulphate (NaLS) or cetyl trimethylammonium bromide (CTAB). The preparation of micelles is described below by way of example with reference to Mn TPP which is an example of a water insoluble manganese porphyrin.

A. Solubilisation of MnTPP in aqueous NaLS (anionic micelles)

Mn TPP can be easily solubilised (up to concentrations $2 \times 10^{-3}$M) in aqueous micellar solutions of NaLS by introducing a concentrated solution of the Mn TPP in acetone into the aqueous NaLS. Approximately 0.5 ml of the acetone solution of MnTPP are introduced per 250 ml of aqueous micellar NaLS solution. On shaking the resultant solution for a few minutes, the Mn TPP is readily incorporated in the micelles. The solvent acetone is subsequently removed from the solution by purging the warmed solution (45°–50° C.), which is kept stirred on a hot plate, with nitrogen gas for about one hour. The solution is then cooled to room temperature. The resultant solutions of aqueous NaLS containing Mn TPP are quite stable as aerated solutions over a wide range of pH for several days. At a high pH (pH$\geq$12), in aqueous NaLS solutions containing a high Mn TPP concentration, the Mn TPP tends to come out of solution over a few days. However, such concentrated solutions are quite homogeneous and fairly stable for periods up to several hours without stirring.

B. Solubilising of Mn TPP in aqueous CTAB (cationic micelles)

The procedure described in A above for aqueous NaLS is followed but the Mn TPP is introduced as a concentrated solution in chloroform rather than as a solution in acetone. In this case also fairly high concentrations of Mn TPP can be solubilised and the resultant solutions are quite stable over a wide range of pH.

The water-insoluble electron acceptors such as tetrachloro benzo-1,4-quinone can be solubilised using similar procedures to those outlined in A and B above.

The apparatus used in the Examples for performing the photolysis in the laboratory is of conventional design and comprises an optical cell in communication with a reaction vessel with a side arm. The apparatus is connected to means for outgassing the solutes and the solvent.

The optical cell has optically flat windows so that the prepared solution can be efficiently irradiated with visible light. The incident radiation may be provided by sunlight or, for laboratory trials, by a conventional light source such as a quartz-iodine lamp.

Experiment A: A non-photochemical oxidation of a manganese (III) complex MnL to the corresponding manganese (IV) complex was performed in order to show that the decomposition of a manganese (IV) complex is the step which leads to the formation of oxygen.

In the experiment, a manganese (III) complex is oxidised in the dark using a persulphate instead of performing the oxidation photochemically using sunlight.

Thus manganese (III) meso-5,10,15,20-tetrapyridyl porphine (MnTPyP) in various concentrations as shown in Table 1 was dissolved in water and the pH of the solution adjusted to 11.5 with NaOH. A concentrated solution of sodium persulphate in water (approx. $10^{-3}$ molar) at pH 11.5 was prepared and small aliquots (approx. 0.5 ml) were added to the above solution with constant stirring. The mixture was monitored by absorption spectroscopy and sodium persulphate solution was added until oxidation to the Mn (IV) complex was complete. The manganese (IV) complex was characterised by an absorption maximum occurring at 416 nm. The oxidation is kinetically slow and complete reaction takes about 1 hr. When stored in the dark, Mn (IV) prepared in this manner is stable over at least several days.

An aliquot of the Mn (IV) solution (5 ml) was placed in the reaction cell of a membrane type oxygen-sensitive electrode as purchased from Rank Bros., Cambridge. The solution was thoroughly purged with oxygen-free nitrogen gas until the chart recorder gave a constant signal showing the minimum amount of residual oxygen. The $N_2$-flow was stopped, the cell sealed and left to stand for about 30 minutes to check for any air leaks. Then, sufficient $HClO_4$ was added to give a final pH of 2. Addition of this acid causes reduction of the manganese (IV) complex to the manganese (II) complex. The acid was added by injection through a supraseal septum cap. Upon acidification, $O_2$ was evolved and its concentration was monitored with the membrane electrode. Blank experiments were carried out in which acid was added to the Mn (III) complex and to persulphate in the absence of Mn but no $O_2$ was detected during these experiments.

During acidification, Mn (IV) is reduced to Mn (II) which, under the conditions of the experiment, is oxidised to Mn (III). The reaction profile obtained for this reaction is shown in FIG. 1 of the accompanying drawings which shows a sequence of absorption spectra taken at different times after addition of $HClO_4$ to the reaction system. The amount of $O_2$ detected during reduction of Mn (IV) is dependent upon the concentration of Mn and the ratio of Mn (II) to $O_2$ remains at $2.0 \pm 0.2$ as shown by the data in the Table.

TABLE 1

| Molar concentration of Mn (II)TPyP | Molar concentration of oxygen |
|---|---|
| $1.40 \times 10^{-5}$ M | $7.0 \times 10^{-6}$ M |
| $1.62 \times 10^{-5}$ M | $8.3 \times 10^{-6}$ M |
| $2.13 \times 10^{-5}$ M | $12.7 \times 10^{-6}$ M |
| $4.21 \times 10^{-5}$ M | $22.3 \times 10^{-6}$ M |
| $7.75 \times 10^{-5}$ M | $34.9 \times 10^{-6}$ M |

This indicates that one molecule of oxygen is formed for the preparation of two molecules of the manganese (II) complex.

In the Examples, oxygen generated during the photolytic reaction is measured with a Clark-type membrane oxygen-sensitive electrode purchased from Rank Bros, Cambridge. Identification of reactants and products was performed by absorption spectrophotometry at the appropriate wavelength. The spectrophotometer was calibrated using authentic samples.

EXAMPLE 1

An aqueous solution of Mn (III) TPyP ($3 \times 10^{-5}$ M) was prepared and the pH adjusted to 7.5 by addition of dilute NaOH solution. Benzo-1,4-quinone ($2 \times 10^{-3}$ M) was added and, after dissolution, the solution was irradiated with visible light.

Figure 2:
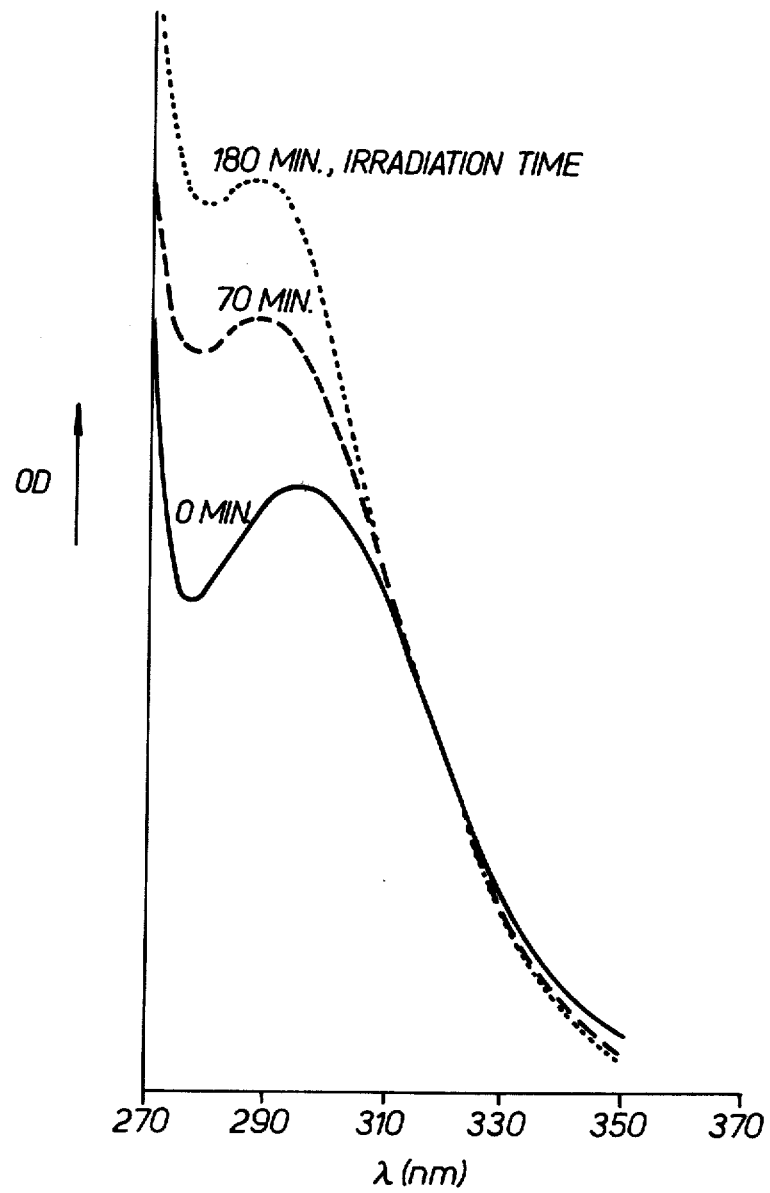
FIG. 2 shows the absorption spectrum obtained during the performance of Example 1 later set forth.

After irradiation the solution contained quinhydrone (formed by combination of the product benzo-1,4-hydroquinone with unreacted benzo-1,4-quinone) as identified by the peak having a maximum occurring at 290 nm in the absorption spectrum shown in FIG. 2 of the accompanying drawings. For this experiment, oxygen was removed from the reaction solution by continuous purging with nitrogen and the reaction vessel used was a conventional spectrophotometer cell.

In order to determine the quantum yield of quinhydrone formation the incident light intensity was determined by means of a potassium ferrioxalate actinometer, and the quinhydrone by means of its absorption at 290 nm. The results are shown in Table 2. The quantum efficiency of the reaction, expressed as the ratio of molecules of quinhydrone (equal to molecules of hydroquinone) formed to the number of absorbed quanta in the region 470±15 nm was therefore 7%. Since the formation of one molecule of hydroquinone involves two electron-transfer steps, the quantum efficiency of a single electron-transfer was therefore 14%.

TABLE 2

| Irradiation time (minutes) | No. of molecules of quinhydrone formed | No. of photons absorbed by the reaction solution |
| --- | --- | --- |
| 70 | $1.22 \times 10^{18}$ | $16.0 \times 10^{18}$ |
| 120 | $2.01 \times 10^{18}$ | $27.4 \times 10^{18}$ |
| 180 | $2.91 \times 10^{18}$ | $41.0 \times 10^{18}$ |
| 300 | $4.45 \times 10^{18}$ | $68.4 \times 10^{18}$ |

Figure 3:
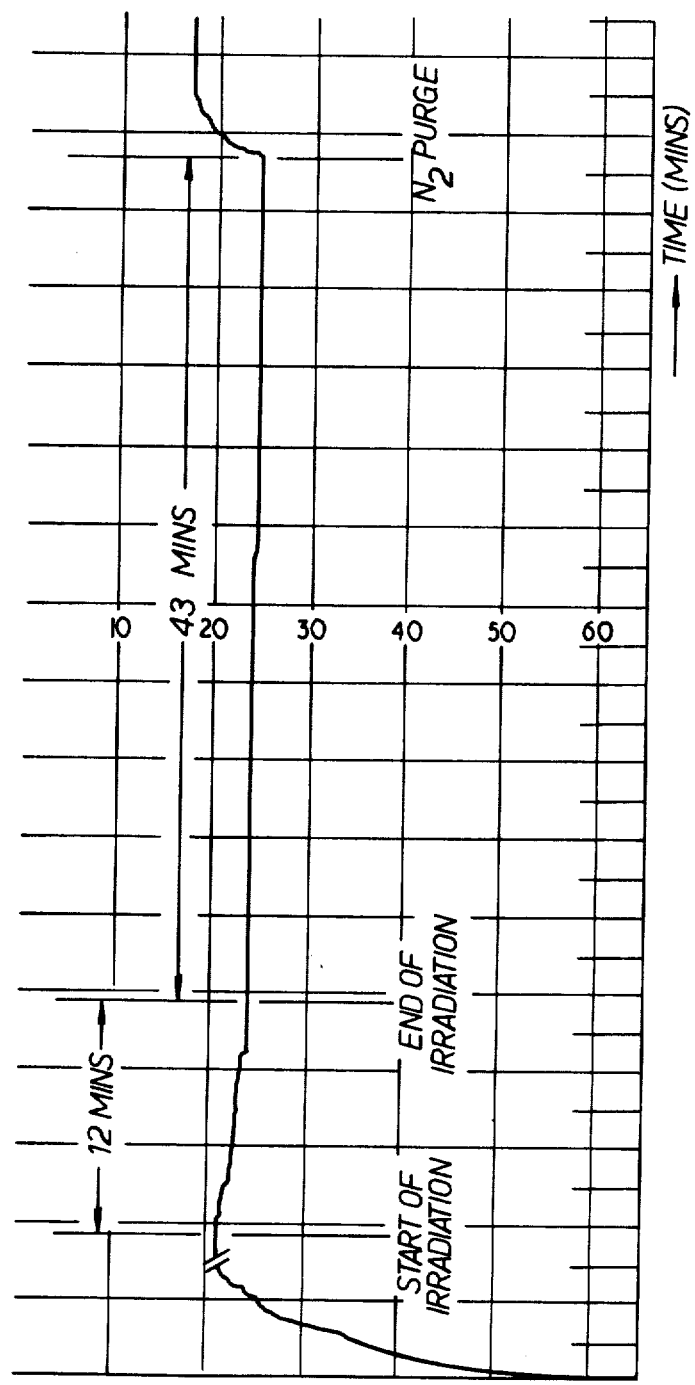
FIG. 3 is a chart obtained during the performance of later recited Example 1 which records the molar concentration of oxygen evolved as a function of time.

In order to establish that oxygen is formed during the photochemical process, separate experiments were carried out in which the reaction solution prepared above was irradiated in the membrane type $O_2$-sensitive cell. The solution was purged with $N_2$ gas before irradiation and the $O_2$ content was monitored continuously by the membrane electrode and displayed on a chart recorder. During irradiation, $O_2$ was evolved. A chart recording showing the molar concentration of oxygen evolved as a function of irradiation time is shown in FIG. 3 of the accompanying drawings. The initial rise on the curve is due to purging the solution with $N_2$. This is followed by a 20 mins. dark period (denoted by \\) and then a period of irradiation. During irradiation the curve falls due to $O_2$ formation. At the end of irradiation, the solution was kept in the dark for 43 mins. and then repurged with $N_2$. The generation of $O_2$ stopped when the light was turned off and purging the solution with a stream of $N_2$ caused the trace to return to the original baseline on the chart recorder. This shows that the species which is causing the observed change is a gaseous species (i.e. oxygen) because the nitrogen used to purge the system will only displace gaseous products.

The reaction of this Example was repeated at pH 7 and 8. At the lower pH values, benzoquinone was found to be more stable (both thermally and towards stray light) but was less reactive towards the Mn TPyP. The yield of $O_2$ was found to be highest at pH 8 but for a long term stability it is better to use pH 7. Therefore, the most appropriate pH for this system would be 7.5.

EXAMPLES 2 TO 4

Example 1 was repeated with manganese (III) meso-5,10,15,20-tetra(4-sulphophenyl)porphine (Mn TSPP; $3 \times 10^{-5}$ M), manganese (III) 4,4',4'',4'''-tetrasulphophthalocyanine (MnPcS; $2 \times 10^{-5}$ M) or manganese (III) meso-5,10,15,20-tetra(N-methylpyridine)porphine ($3 \times 10^{-5}$) replacing MnTPyP. Thus, for example an aqueous solution of MnPcS ($2 \times 10^{-5}$ M) at pH 7.5 was prepared and benzo-1,4-quinone ($2 \times 10^{-3}$ M) added.

In each case, after irradiation of the prepared solution with visible light, the solution was found to contain quinhydrone as in Example 1.

EXAMPLES 5 TO 20

Example 1 was repeated but using the quinones listed in Table 3 below instead of benzo-1,4-quinone as the electron acceptor.

In these Examples, with substituted benzo-1,4-quinones the preferred pH is 7.5 or 8.0 depending upon the stability of the quinone. With naphtha-1,4-quinone the preferred pH is 8.0 and with substituted anthra-9,10-quinones a pH of 9.0 is used. In all cases, the reduced quinone can be detected by absorption spectroscopy. Similar concs of both Mn complex and quinone as the above examples were used.

For example an aqueous solution of Mn Pc S ($2 \times 10^{-5}$ M), at pH 7.5, was prepared as above. 2,3-Dicyano-5-phenyl sulphonylbenzo-1,4-quinone ($4 \times 10^{-3}$ M) (Example 14) was added and the solution was irradiated with visible light.

In each case the irradiation produces the corresponding hydroquinone.

EXAMPLES 21 AND 22

Dyes such as thionine and methylene blue readily act as electron acceptors when irradiated with visible light. In these Examples, the concentration of dye is $1 \times 10^{-5}$ M and the concentration of the Mn complex is about $5 \times 10^{-5}$ M. All the experiments were performed at pH 9 using a phosphate buffer. Irradiation leads to bleaching of the dye which can be recovered by introduction of air.

The overall efficiency of a solar photochemical system of the kind described here is given by $$\Phi \times F_s \times S_m$$

wherein $\Phi$ represents the quantum efficiency of the photochemical reaction,

Fs represents the fraction of absorbed energy stored by the reaction at the threshold wavelength, and Sm represents the maximum possible efficiency for sunlight below the threshold.

In Example 1, the measured $\Phi = 0.14$ and the stored energy for a single electron transfer from water to benzo-1,4-quinone is 0.53 e.v. The threshold absorption wavelength for the complex $Mn^{III}T Py P$ is 610 nm, the energy of which is 2.1 e.v.

Therefore $F_s = 0.53/2.1 = 0.25$

For the threshold wavelength of 610 nm, $S_m = 0.29$

The overall efficiency of the process of Example 1 as a solar collector is therefore $$0.14 \times 0.25 \times 0.29 = 0.010 = 1.0\%$$

This is already higher than is generally obtained in plant photosynthesis in the field. It may be increased by the use of the other examples given so as to optimise (1) the quantum efficiency, (2) the energy stored in the chemical reaction (e.g. anthraquinone stores twice as much energy as benzoquinone) and (3) extension of the absorption threshold above 610 nm (e.g. by use of phthalocyanins whose threshold is 700 nm).

The theoretical maximum efficiency of a photochemical solar energy collector employing a single reaction is 48%, with a threshold of 700 nm this becomes 31%. By optimum use of the examples of this invention it is expected that an overall efficiency of solar energy storage of about 10% will be possible.

TABLE 3

Quinone (substituted benzo-1,4-quinones)

| Example No. | $R^1$ | $R^2$ | $R^3$ | $R^4$ |
|---|---|---|---|---|
| 5 | $CH_3$ | $CH_3$ | $CH_3$ | $CH_3$ |
| 6 | H | $CH_3$ | $CH_3$ | $CH_3$ |
| 7 | H | H | $CH_3$ | $CH_3$ |
| 8 | H | H | H | $CH_3$ |
| 9 | Cl | Cl | Cl | Cl |
| 10 | Cl | Cl | CN | CN |
| 11 | H | H | CN | CN |
| 12 | $SO_3H$ | H | H | H |
| 13 | $SO_3H$ | H | CN | CN |
| 14 | $SO_2C_6H_5$ | H | CN | CN |

15  1,4-naphthaquinone (substituted anthra-9,10-quinones)

| | $R^1$ | $R^2$ | $R^5$ | $R^6$ |
|---|---|---|---|---|
| 16 | $SO_3H$ | H | H | H |
| 17 | H | $SO_3H$ | H | H |
| 18 | H | $SO_3H$ | H | $SO_3H$ |
| 19 | $SO_3H$ | H | $SO_3H$ | H |
| 20 | COOH | H | COOH | H |

What is claimed is:

1. A process for the catalytic photo-oxidation of water by visible light which process comprises irradiating with light in the visible region of the spectrum a solution comprising:
   (i) water,
   (ii) as photocatalyst, a starting manganese complex which is a manganese (II) or manganese (III) complex of formula Mn L wherein L is a phthalocyanine ligand, a 5,10,15,20-tetraphenylporphyrin ligand or a 5,10,15,20-tetrapyridyl porphyrin ligand, each of said ligands optionally being substituted by further substituents, the said starting manganese complex being capable of undergoing a transition into an excited state on irradiation with visible light with subsequent conversion to the corresponding manganese
   (IV) complex, and
   (iii) a compound which is an electron acceptor and which is a sufficiently powerful oxidising agent to abstract electrons from the excited manganese complex, the pH of the reaction mixture being chosen so that upon irradiation, the starting manganese complex will be oxidised to the corresponding manganese (IV) complex and the electron acceptor will be reduced to form a reduced electron acceptor and so that, subsequently, the manganese (IV) complex will be reduced back to the corresponding manganese (II) complex with concomitant conversion of water into oxygen.

2. A process according to claim 1, wherein the ligand L is selected from the group consisting of phthalocyanine and 5,10,15,20-tetraphenylporphyrin each containing from two to eight water solubilising group.

3. A process according to claim 2, wherein the water solubilising groups are carboxy or sulpho groups.

4. A process according to claim 1, wherein the complex MnL is a phthalocyanine complex of formula:

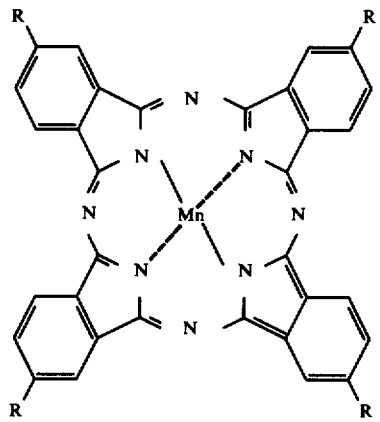

wherein R is a —$CO_2H$, —$CO_2R'$, —$SO_3H$ or —$SO_2NHR'$ group, wherein R' is a $C_{16}$ to $C_{22}$ alkyl group.

5. A process according to claim 1, wherein the complex MnL is a tetraphenylporphyrin complex of formula:

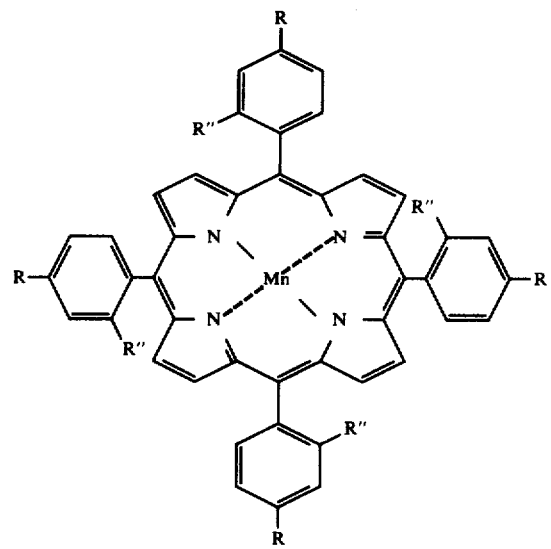

wherein R" is a $C_1$ to $C_4$ alkyl group, and R is a —$CO_2H$, —$CO_2R'$, —$SO_3H$ or —$SO_2NHR'$ group wherein R' is a $C_{16}$ to $C_{22}$ alkyl group.

6. A process according to claim 1, wherein the MnL complex is a tetrapyridylporphyrin complex of formula:

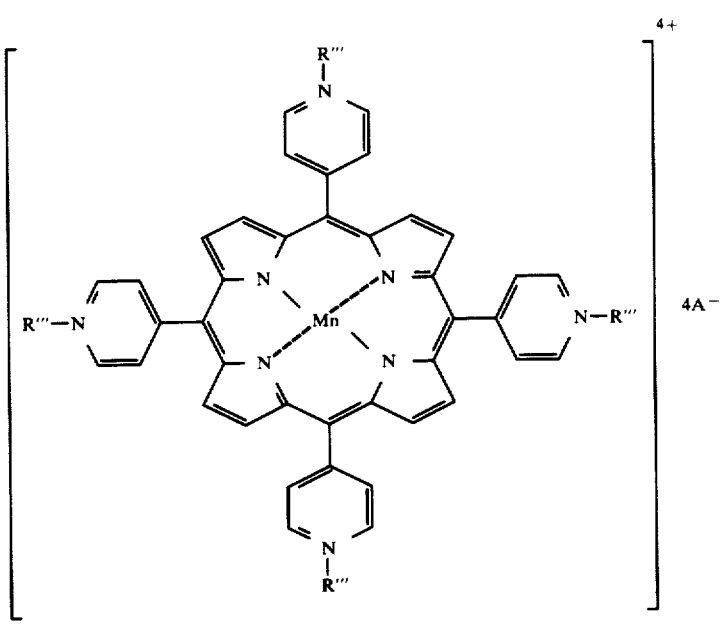

wherein each R''' group is a $C_{1-4}$ alkyl group and $A^-$ is a suitable anion, or the free base thereof.

7. A process according to claim 6, wherein in the MnL complex each R''' is a methyl group and $A^-$ is an iodide ion.

8. A process according to claim 1, wherein the MnL complex is manganese (III) tetrapyridylporphyrin—N,-N',N'',N'''-tetra ($C_{16}$ to $C_{22}$ alkyl).

9. A process according to claim 1, wherein the electron acceptor is a quinone.

10. A process according to claim 9, wherein the electron acceptor is a benzo-1,4-quinone or an anthra-9,10-quinone, each optionally substituted with one or more groups chosen from alkyl, chloro, sulpho, phenylsulphonyl and cyano groups; or a 1,4-naphthaquinone.

11. A process according to claim 10, wherein the electron acceptor is a benzo-1,4-quinone of general formula (I):

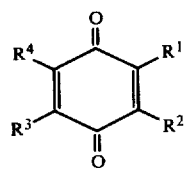

(I)

wherein each of $R^1$, $R^2$, $R^3$ and $R^4$ independently represents a hydrogen or a chlorine atom, or a methyl, sulpho, phenylsulphonyl or cyano group.

12. A process according to claim 10, wherein the electron acceptor is a benzo-1,4-quinone of general formula (I):

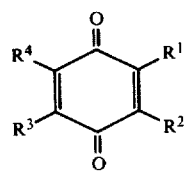

wherein each of $R^1$, $R^2$, $R^3$ and $R^4$ independently represents a $C_{16}$ to $C_{22}$ alkyl group.

13. A process according to claim 10, wherein the electron acceptor is an anthra-9,10-quinone of general formula (II):

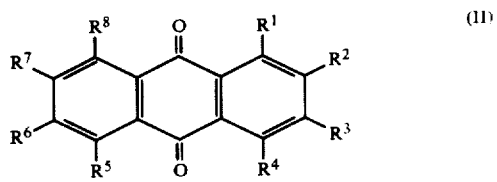

(II)

wherein each of $R^1$ to $R^8$ independently represents a hydrogen or chlorine atom or a methyl, sulpho, phenylsulphonyl, cyano or carboxy group.

14. A process according to claim 13, wherein the electron acceptor is an anthra-9,10-quinone of general formula (II) wherein each of $R^1$ and $R^2$ independently represents a hydrogen atom or a sulpho or carboxy group, and each of $R^5$ and $R^6$ independently represents a hydrogen atom, or a sulpho or carboxy group.

15. A process according to claim 1, wherein the electron acceptor is a heterocyclic compound such a pyrazine, mono-, di, tri- or tetramethylpyrazine, quinoxaline, phenazine, N-methylphenazine sulphate, NADH, methylviologen or benzyl viologen; or a dye such as thionine or methylene blue.

16. A process according to claim 1, wherein a micelle forming surfactant is used to solubilise the manganese complex or the electron acceptor.

17. A process according to claim 1, wherein the concentration of electron acceptor is such that the molar ratio of electron acceptor to MnL complex is of the order of 100:1.

18. A process according to claim 1, wherein the solution further includes one or more absorbers for collecting the incident higher energy radiation thereby to enhance the photo-oxidation of the starting manganese complex.

19. A process according to claim 1, wherein the pH i from 7 to 9.